July 1, 1969
J. B. WALKER, JR
3,453,016
ARTICLE LIFTING DEVICE
Filed Aug. 4, 1967
Sheet _1_ of 2
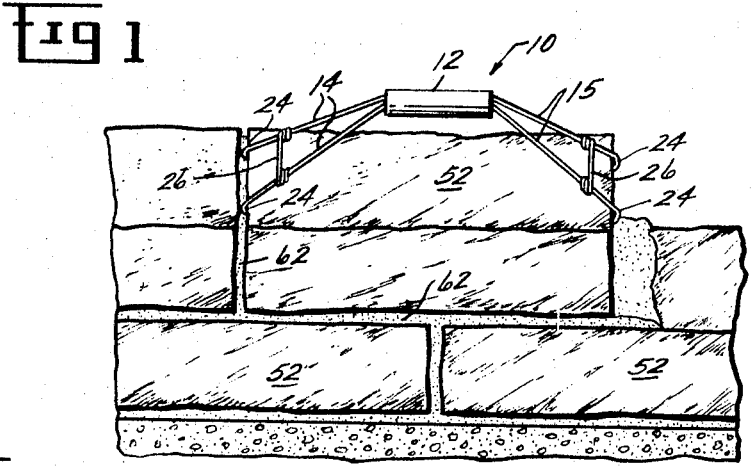
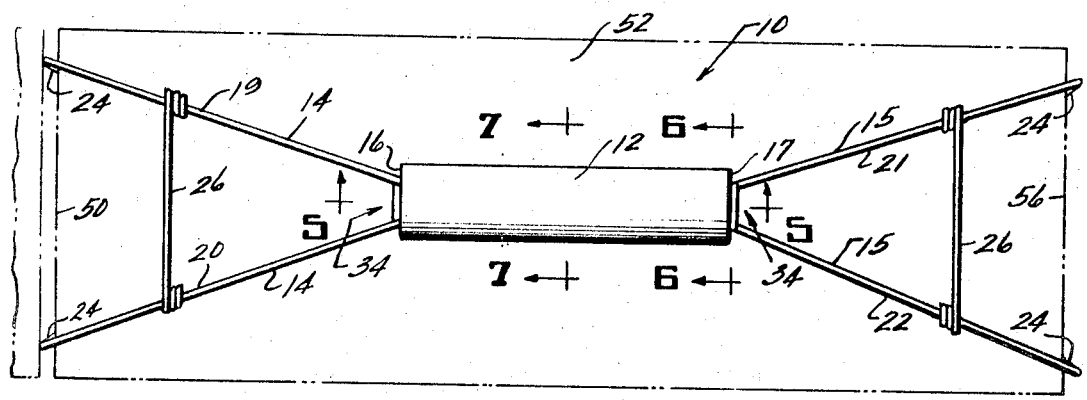
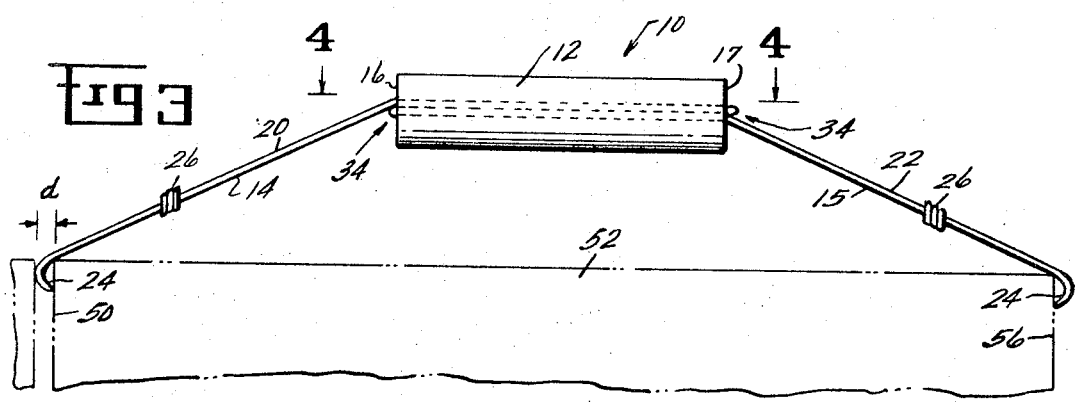
INVENTOR.
JAMES B. WALKER, JR.
BY
Pearce and Schaeperklaus
ATTORNEYS—

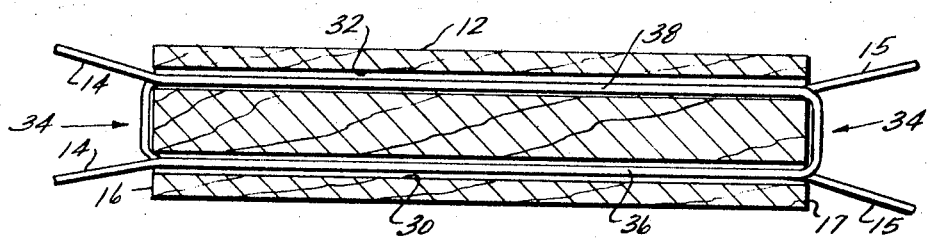
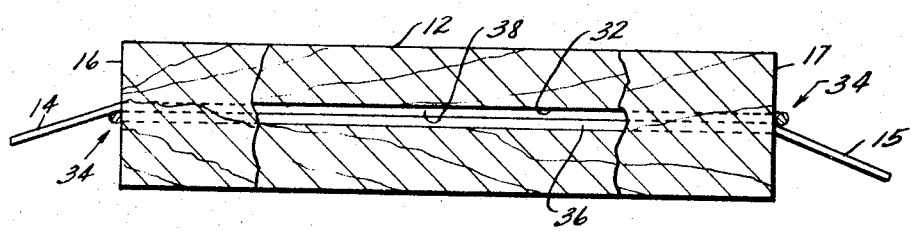
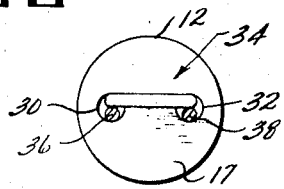
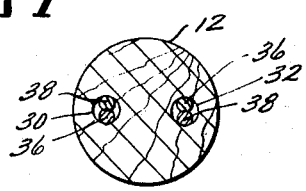
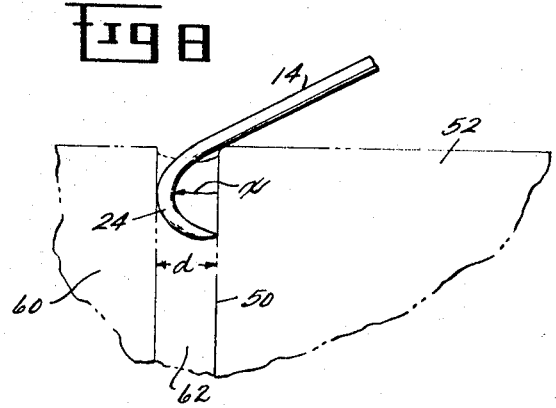

United States Patent Office 3,453,016
Patented July 1, 1969

3,453,016
ARTICLE LIFTING DEVICE
James B. Walker, Jr., 205 Quarry Drive,
Lawrenceburg, Ind. 47025
Filed Aug. 4, 1967, Ser. No. 658,416
Int. Cl. B65g 7/12; E04g 21/16
U.S. Cl. 294—16                              7 Claims

ABSTRACT OF THE DISCLOSURE

A simply constructed and efficiently operable hand device comprising a handle having a pair of spaced arm members extending from each of its respective ends, each arm member in each pair having at its end a hook by which an article such as a stone or a brick can be lifted. The arm members in each pair diverge with respect to each other and are maintained in relative position to each other by a spacing rib. The arms are made of flexible material in elongated rod-like configuration, such as resilient spring steel. Each pair of arm members project from central segments of an individual rod-like member, formed by looping of the member, inserting the central segments into respective spaced bores in the handle, with the arm members projecting at the opposite end of the handle. The same pair of bores is used for the second set of arm members which project from the opposite end of the handle. The arm members extend angularly downwardly with respect to a horizontal plane passing through the longitudinal axis of the handle.

Background of the invention

*Field of the invention.*—The field of art to which the invention is most likely to pertain is generally located in the class of apparatus relating to hand implements and tools. Class 294, Handling, Hand and Hoist-line Implements; Class 254, Pushing and Pulling Instruments; and Class 81, Tools, United States Patent Office Classifications, appear to be the applicable general areas of arts in which the claimed subject matter of the type involved here may have been classified in the past.

*Description of the prior art.*—Tools in the arts to which this invention most likely pertains are disclosed in the following U.S. Letters Patents: Nos. 661,033, 705,416, 806,672, 1,822,102 and 3,084,968.

Summary

This invention particularly relates to a hand implement for laying stone blocks.

An object of this invention is to provide for a hand tool for lifting, positioning, and releasing a stone block placed in alignment in the formation of a wall or the like.

Another object of this invention is to provide for a hand tool comprising a minimum number of elements efficiently combined together to achieve the result of lifting and releasing of a stone block or the like by easy manipulation thereof.

A further object of this invention is to provide for a hand tool inexpensive to manufacture, made of conventional materials, simple in use and long lasting in application.

Another object of this invention is to provide for an efficient and proper laying of a stone block or the like in proper alignment with respect to a previously laid stone block or the like, by means of the features contained in the hand tool and simple manipulation thereof.

Another object of this invention is to provide for a stone laying device by which consecutively laid stones or the like are laid in accurately spaced manner by utilization of the grappling means on the device.

These and other objects and advantages will become more apparent to a mechanic skilled in the art or arts to which this invention pertains by a full reading of the following description, appended claims thereto, and by reference to the drawing comprising two sheets and constituting a part of this disclosure.

Brief description of the drawing

FIG. 1 is the perspective view of the hand tool embodying the invention in use.

FIG. 2 is a plan view of the hand tool embodying the invention.

FIG. 3 is an elevational view of the device embodying the invention.

FIG. 4 is a view taken on the line 4—4 of FIG. 3.

FIG. 5 is a view taken on line 5—5 of FIG. 2.

FIG. 6 is an end view of the device taken on line 6—6 of FIG. 2.

FIG. 7 is a view taken on line 7—7 of FIG. 2.

FIG. 8 is an exploded view of a portion of the device shown in FIG. 3.

Description of the preferred embodiment

Referring now to the drawing in which reference characters therein correspond to like numerals in the following description, 10 (FIG. 1) represents the device embodying the invention. Device or hand tool 10 comprises (FIGS. 2, 3) a handle 12, first and second pairs of arm members 14, 15, respectively, each such pair extending outwardly of its corresponding end 16, 17 of handle 12, with each pair 14, 15 in opposed relation to each other. Each pair of arm members 14, 15 include arms 19, 20 and 21, 22, respectively. A grappling means 24 is provided at the end of each arm 19, 20, 21, 22, and is preferably integrally formed from its associated arm in the shape of a downwardly protruding hook. A rigid spacing rib 26 is securely mounted between the respective arms of each pair of arm members 14, 15 for maintaining and limiting divergence of such arm members 14, 15, assuring confinement of all of the grappling means 24 within the linear dimensions of the article to be lifted, as will become more apparent hereinafter.

Handle 12 is preferably made of wood or other sturdy and suitable material and in cylindrical form, and is provided with a pair of spaced bores 30, 32 (FIGS. 4, 6) extending longitudinally throughout its length. Each pair of arm members 14, 15 is formed from a single strip of resilient elongated rod-like material such as spring steel. Such strip or element is looped such as at 34 (FIGS. 4, 5, 6), and thereby forms central segments 36, 38, each of which extends through its corresponding bore 30, 32 of handle 12 upon assembly of device 10, as shown in FIGS. 4, 5, 6 and 7. Arms 19, 20 of the pair of arm members 14 and arms 21, 22 of the pair of arm members 15 are integrally formed of and are extensions of central segments 36, 38 of their respective rod-like elements. After insertion of each looped strip of spring steel through the pair of spaced bores 30, 32, each pair of arm members 14, 15 is sprung at their junction with central segments 36, 38, such junction disposed at its corresponding end 16 or 17 of handle 12, i.e., at the end of handle 12 opposite the end at which the looping occurs, so that each such pair is extending angularly downwardly with respect to a horizontal plane passing through the length of handle 12, and caused to have each of its arms to diverge one from the other by again springing them, away from each other. Each of bores 30, 32 may be sufficiently large in diameter to accommodate the diameters of central segments 36, 38 of both rod-like elements utilized in this preferred embodiment of the invention, as will become more apparent in the following description concerning assembly of the above described elements into tool 10. It should be understood that more than one pair of bores may be utilized.

It should be further understood that divergence of the arms in each pair of arm members 14, 15 includes the meaning of a simple parallel relationship between the respective arms of each pair of arm members, as distinguished from a physical or geometrical divergence of such arms one from the other, for the concept of this invention contemplates parallel arms as well as diverging arms. Divergence, of course, is limited by the linear dimensions of the object to be lifted in practical and assembly considerations.

Assembly of the above described elements may be performed as follows. After the pair of spaced bores 30, 32 have been provided in handle 12, a loop midway of the length of a single strip of spring steel is fashioned. The ends of such strip are then inserted through the respective bores 30, 32 at one end 16 of handle 12, so that its loop 34 is braced against end 16. Similarly, a second looped strip of spring steel is inserted through bores 30, 32 in handle 12 from end 17 thereof, whereby its loop 34 is braced against end 17. With segments 36, 38 of each such strips now being disposed within their respective bores 30, 32 each pair of arm members 14, 15 is sprung downwardly and laterally, that is, angularly downwardly with respect to a horizontal plane passing through the length of handle 12 and the arms of each pair of arm members 14, 15 sprung away from each other. A rigid spacing rib 26 is then fashioned from similar spring steel material, by curling its ends crosswise to and between arms 19, 20 and 21, 22 of the first and second pairs of arm members 14, 15. Each grappling means 24 may then be fashioned upon the end of each arm 19, 20, 21, 22.

In operation, the user grasps handle 12 in his hand and applies a pair of grappling means 24, mounted on either pair of arm members 14, 15, to a side face 50 of a stone block 52 (FIGS. 3, 8). The user then manually springs tool 10 downwardly towards block 52, thereby extending the distance between the two pairs of grappling hooks 24 at the extreme opposing limits of device 10 to a length greater than that of block 52. The tension on tool 10 is then relaxed so that the second pair of means 24 can be lowered upon and linked to opposite side face 56 of block 52. Stone block 52 is then ready to be lifted, with all grappling means 24 frictionally engaging faces 50, 56 thereof.

An advantage is provided by incorporation of a proper curvature in each hook 24. As illustrated in FIG. 8, such curvature is represented by a radius $x$ by which a linear distance $d$ is provided. Distance $d$ represents the separation or space desired between consecutively aligned and laid stone blocks 52, 60. In other words, by manufacturing the proper curvature in each grappling hook 24, each stone block 52, 60 may be laid in proper aligned and spaced position relative to its immediately adjacently laid block, eliminating the necessity of the user to push and pull each successively laid block into position against mortar 62.

Other advantages of tool 10 should be apparent, not necessarily limited to the saving of wear and tear on gloves otherwise occurring. Also, injuries to hands are eliminated. In present day application, gloves wear out in mere days when applied directly to surfaces of stones and similar types of material that are laid by masons, stonelayers, and bricklayers. The construction of tool 10 is simple although not limited to the particular construction or assembly hereinbefore described. No gluing, securements, or other additional attachments after assembly appear to be required.

This invention also contemplates application of tool 10 to lifting of objects other than stone or brick, such as cartons, boxes and other forms of packaging which are readily carriable by tool 10.

What I claim as patentably novel is:
1. An article lifting device comprising in combination:
   a handle,
   at least one pair of spaced bores extending longitudinally between the opposing ends of said handle,
   a first resilient elongated rigid rod-like element looped and braced at one end of said handle, central segments formed by such looping each of such segments extending through a corresponding one of said bores, and a pair of spaced arms each of such arms extending from a corresponding central segment at the opposite end of said handle projecting outwardly thereof,
   a second resilient elongated rigid rod-like element looped and braced at said opposite end of said handle, central segments formed by such looping each of such segments extending through a corresponding one of said bores, and a pair of spaced arms each of such arms extending from a corresponding central segment at said end of said handle projecting outwardly thereof,
   each said pair of spaced arms disposed angularly downwardly of the plane of said handle, and
   grappling means mounted on the end of each arm in each of said pair of arms,
   the resiliency of mounting of said pairs of arms to said handle providing for facile hooking to and releasing of said device on an article.

2. The device of claim 1 in which said grappling means comprises a hook.

3. The device of claim 1 including means for maintaining and limiting divergence of the arms in each pair thereof.

4. The device of claim 3 in which said means comprises a rigid rib securely attached crosswise to and between the arms of each pair thereof, assuring confinement of said grappling means within the linear dimensions of the article to be lifted.

5. The device of claim 1 including means for maintaining and limiting divergence of
   the arm members in each pair thereof, and a hook constituting said grappling means.

6. The device of claim 5 in which said means comprises a rigid rib securely attached crosswise to and between the arm members of each pair thereof to ensure constant spacing thereof.

7. In an article lifting device comprising a handle and two pairs of arms each pair extending from an end of said handle and in opposing direction to each other, the improvement comprising:
   central segments for each pair of arms and being disposed in bores extending longitudinally of said handle,
   each of said central segments being looped and braced at its end of said handle,
   each of such pairs of arms joining its corresponding central segments at the end of said handle opposing the end of said handle at which such central segments are looped and braced.

References Cited

UNITED STATES PATENTS 2,023,328    12/1935    Lamp _____ 294—16

ANDRES H. NIELSEN, *Primary Examiner.*